(12) United States Patent
Loui et al.

(10) Patent No.: US 7,299,763 B2
(45) Date of Patent: Nov. 27, 2007

(54) HULL WITH PROPULSION TUNNEL AND LEADING EDGE INTERCEPTOR

(75) Inventors: Steven Loui, Honolulu, HI (US); Scott Yamashita, Honolulu, HI (US)

(73) Assignee: Navatek, Ltd., Honolulu, HI (US)

( * ) Notice: Subject to any disclaimer, the term of this patent is extended or adjusted under 35 U.S.C. 154(b) by 34 days.

(21) Appl. No.: 11/294,416

(22) Filed: Dec. 6, 2005

(65) Prior Publication Data

US 2006/0130731 A1    Jun. 22, 2006

Related U.S. Application Data

(60) Provisional application No. 60/637,736, filed on Dec. 22, 2004.

(51) Int. Cl.
*B63B 1/32* (2006.01)

(52) U.S. Cl. ...................................... 114/288; 114/289

(58) Field of Classification Search ................ 114/288, 114/289
See application file for complete search history.

(56) References Cited

U.S. PATENT DOCUMENTS

| | | | |
|---|---|---|---|
| 2,928,365 A | 3/1960 | Moon | 114/145 |
| 3,709,179 A | 1/1973 | Payne | 114/66.5 |
| 4,371,350 A * | 2/1983 | Kruppa et al. | 440/69 |
| 4,685,889 A | 8/1987 | Nystrom | 440/69 |
| RE33,165 E | 2/1990 | Whitehead | 440/69 |
| 4,907,520 A | 3/1990 | Pipkorn | 114/61 |
| 4,977,845 A | 12/1990 | Rundquist | 114/289 |
| 5,111,763 A | 5/1992 | Moerbe | 114/246 |
| 5,158,033 A | 10/1992 | Evans | 114/289 |
| 5,193,478 A | 3/1993 | Mardikian | 114/286 |
| 5,970,898 A | 10/1999 | Pereira | 114/55.5 |
| 6,006,689 A | 12/1999 | Olofsson | 114/285 |
| 6,213,824 B1 | 4/2001 | Small | 440/68 |
| 6,216,624 B1 | 4/2001 | Page | 114/145 |
| 6,250,246 B1 * | 6/2001 | Hubley | 114/288 |

* cited by examiner

*Primary Examiner*—Stephen Avila
(74) *Attorney, Agent, or Firm*—Fitzpatrick, Cella, Harper & Scinto (57) ABSTRACT

A boat hull has at least one ventilating propulsion tunnel formed therein open to the water forward of the hull's transom and adapted to contain a propeller of the propulsion system. The tunnel has a leading edge forward of the transom and an interceptor plate projects downwardly from the hull at the leading edge.

21 Claims, 9 Drawing Sheets

HULL WITH PROPULSION TUNNEL AND LEADING EDGE INTERCEPTOR

SUMMARY OF THE INVENTION

This application claims the benefit of U.S. Provisional Application No. 60/637,736, filed Dec. 22, 2004.

The present invention relates to boat hulls and more in particular to boat hulls having ventilating propulsion tunnels containing surface propellers.

BACKGROUND OF THE INVENTION

Field of the Invention

Watercraft speed efficiency is achieved by reducing craft drag and improving the efficiency of the propulsion system. The result is higher speeds for the same amount of power used or less power needed to achieve the same speed.

Two prior art technologies previously developed to accomplish these goals are surface propellers operating in ventilating propulsion tunnels formed in the watercraft hull and flow interceptors attached to the transom of a watercraft. Flow interceptors project downwardly from the transom below the hull surface either vertically or at an angle. One such system is shown in U.S. Pat. No. 6,006,689.

It has been found that the use of surface propellers in ventilating propulsion tunnels improves the control of water flow to the propeller and thereby improves propulsive efficiency. The use of propulsion tunnels in this way also reduces the hull and appendage wetted area, thereby reducing drag. In addition, on the other hand, propulsion tunnels reduce the amount of the buoyant and dynamic lift of the hull.

Transom mounted flow interceptors have been found to reduce hull drag by providing lift which reduces hull immersion in the water. Reducing hull drag improves watercraft seakeeping and propulsive efficiency by providing trim control forces to achieve the optimal watercraft trim (which varies with speed), watercraft weight and sea conditions. Such systems are usually mounted directly at the transom, which creates large trimming moments that can push the bow down and create an adverse trim condition.

It is an object of the present invention to increase dynamic lift in hulls having ventilating propulsion tunnels.

It is a further object of the invention to reduce wetted surface area and drag in hulls having ventilating propulsion tunnels.

Yet another object of the invention is to provide dynamic lift to a hull replacing buoyant lift lost by the presence of ventilating tunnels, while minimizing trimming moments on the hull.

BRIEF DESCRIPTION OF THE INVENTION

In accordance with an aspect of the present invention a flow interceptor is provided at the leading edge of a boat hull's ventilating propulsion tunnel to improve control of the water flow and propulsive efficiency. The leading edge propulsion tunnel interceptor (LEPTI) of the invention reduces wetted area and drag and provides dynamic lift more efficiently than the buoyant lift amounts lost by the presence of a tunnel or tunnels.

As compared to a transom mounted interceptor, the LEPTI provides greater lift and reduction of hull immersion and also provides comparable trim control forces.

In conventional ventilating propulsion tunnel hulls, the depth of water flow to the propeller in the ventilating propulsion tunnels is the depth of the tunnel cutwater, i.e., the depth of the front edge of the tunnel. LEPTI provides a means of deepening the flow coming off a simple cutwater to the depth of the immersed interceptor. It thereby reduces propeller and propeller appendage drag by reducing the height of the flow aft of the interceptor and increasing the unwetted area of the rudder, propeller, propeller hub, shaft and strut.

By producing more hull lift with the interceptor a greater reduction in hull immersion and therefore drag is produced. By using LEPTI, a greater amount of lift also can be generated on the hull as compared to that created by prior art transom mounted interceptors. Moreover, since the LEPTI is closer to the longitudinal center of gravity (LCG) of the hull, the lift it generates will create a lower trimming moment than the same amount of lift generated by a transom mounted interceptor, which is further from the LCG. Trimming moments will eventually push the bow down to an excessive and adverse bow down trim condition and the onset of this condition will be reached later with the greater lifting force and lesser trimming moment provided by the LEPTI.

The use of the LEPTI in accordance with the invention produces more consistent flow to the propellers and therefore higher efficiency than prior art prop tunnels with simple cutwaters. The velocity of flow coming off a conventional propulsion tunnel cutwater can vary in direction and speed because of hull surface variations causing drag and flow direction variations. Velocity of the flow coming off an interceptor is more consistent in direction and speed since the stagnation line in front of the interceptor reduces the flow velocity across that line to 0 and then consistently accelerates the flow behind the interceptor to a consistent speed and flow direction.

BRIEF DESCRIPTION OF THE DRAWINGS

The above and other objects, features and advantages of the present invention will become apparent from the following detailed description thereof, which is to be read in conjunction with the accompanying drawings, wherein.

DETAILED DESCRIPTION OF THE PREFERRED EMBODIMENTS

Figure 1:
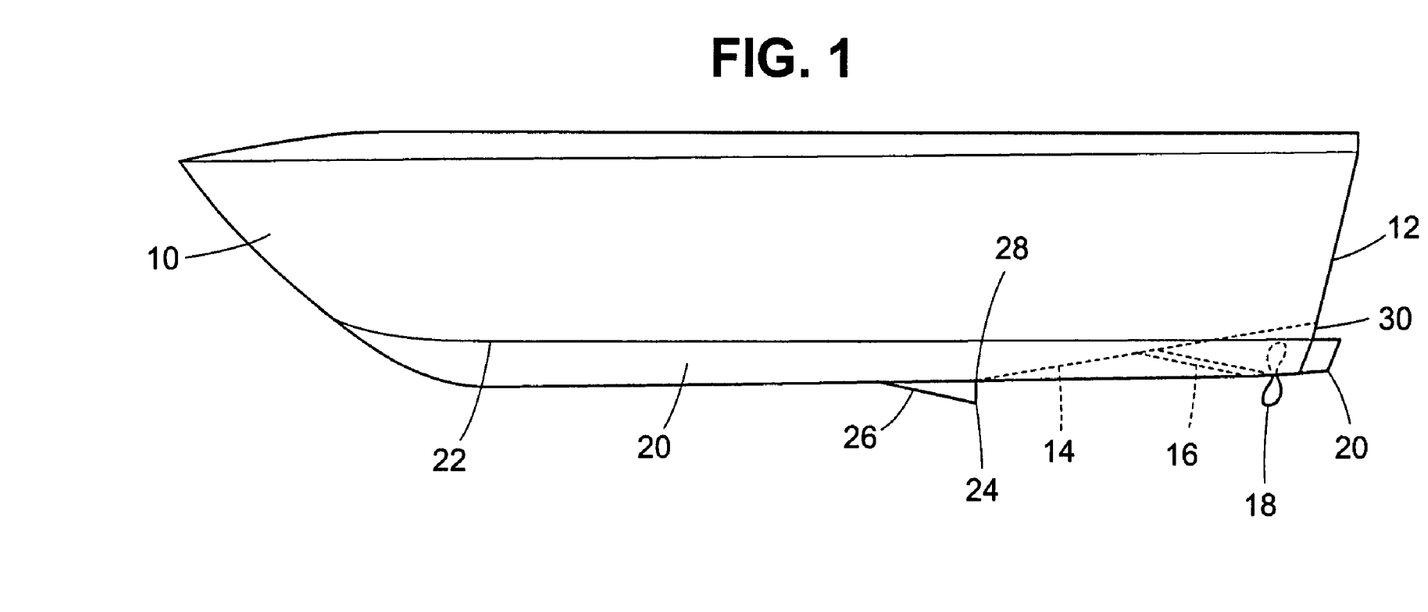
FIG. 1 is a side elevational view of a boat hull including a LEPTI in accordance with the present invention.

Referring now to the drawings in detail, and initially to FIG. 1, a boat hull 10 is illustrated which includes a rear transom 12, and a ventilating propulsion tunnel 14 formed in the bottom 20 of the hull. A conventional propeller shaft 16, propeller 18 and rudder 20 are located within or aligned with the propulsion tunnel. The power plant (not shown) operates the propeller as a surface propeller, i.e., one which operates at the water surface with approximately ½ the propeller diameter immersed in water. The hull 20 includes chines 22, also seen in FIGS. 2 and 4.

In accordance with the present invention, immediately forward of the propulsion tunnel 14, an interceptor plate 24 is provided at the leading edge of the tunnel which depends downwardly from the surface of the bottom 20 of the hull 10. Immediately forward of interceptor plate 24 are a pair of spaced generally triangular side plates 26 which are either fixed to the hull or integrally formed with the interceptor plate 24.

Figure 2:
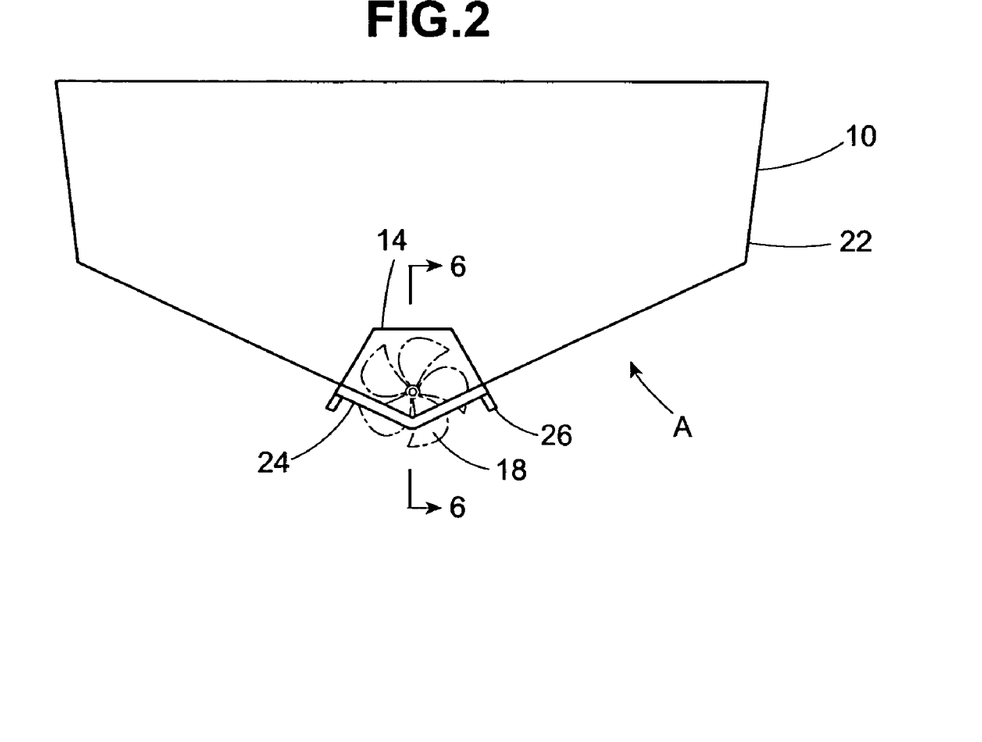
FIG. 2 is a rear view of the hull of FIG. 1 in which the hull has a single ventilating propulsion tunnel.
Figure 3:
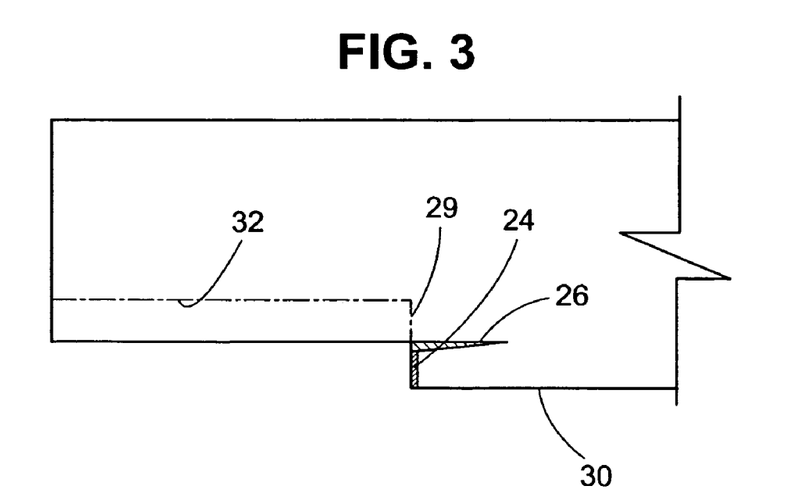
FIG. 3 is a view taken in the direction of the arrow A in FIG. 2.

The construction of the interceptor plate is more clearly illustrated in FIGS. 2 and 3. In this embodiment the hull 10 has a single ventilating propulsion tunnel 14 in which the prop 18 and its associated shaft is located. As seen in FIG. 1, the tunnel 14 may generally taper in height from the bottom of the hull at a leading edge 28 to a greater height above the hull bottom at the point 30 on transom 12. Alternatively, the tunnel may begin abruptly at the leading edge so that it has a front wall 29 (See FIG. 7) that rises perpendicularly from bottom 20 to the "ceiling" 32 of tunnel 14.

In conventional ventilating propulsion tunnel hulls, the leading edge of the tunnel 28 forms a so-called "cutwater" so that the water surface beneath the tunnel generally lies at the level of that tunnel leading edge and remains generally flat beneath the tunnel so that the part of the tunnel above the water surface contains air while the propeller is only partially immersed in the water. As noted above, this arrangement reduces drag on the vessel by eliminating substantial immersion of the shaft and propeller.

In accordance with the present invention, the leading edge propulsion tunnel interceptor (LEPTI) consisting of the interceptor plate 24 and the side plates 26 (only one of which is seen in the side view of FIG. 3) are located such that the downwardly depending interceptor plate 24 extends below the hull or keel 30 in this embodiment, a pre-determined distance, depending in part on the size of the vessel, with the side plates 26 tapering in a triangular shape towards the forward end of the hull.

The leading edge propulsion tunnel interceptor may also be referred to as a spoiler or a vertical trim tab. It is either fixed in place or movably mounted on the hull.

Preferably, as described hereinafter, the position of at least the vertical interceptor plate 24 is adjustable so that the amount of penetration of the interceptor plate into the water beneath the hull may be varied. The provision of an LEPTI in accordance with the invention creates an adjustable cutwater that allows the operator to control the height of the free surface immersion of the surface propeller within the tunnel, thereby reducing drag as described above, and reducing propeller loading. The practical range of adjustment is small, for example, perhaps up to 3 inches, but at low speeds there is a synergistic effect provided by the LEPTI between the benefit of reducing propeller loading and the resistance created when engine rpm and torque is low.

The LEPTI of the invention also effectively functions as a lift augmentation appendage by creating a high stagnation pressure on the hull immediately forward of the interceptor. This also reduces drag by reducing the total area of hull immersed in the water.

The function of the side plates 26 on the hull is to contain the stagnation pressure and to mitigate tip vortices in the ventilating propeller tunnel and also to prevent separated flow of the trailing edge of the interceptor, which would occur if the tunnel was not ventilated.

In addition, because the propeller tunnel is forward of the transom 12, its leading edge is thereby closer to the longitudinal center of gravity of the hull (the LCG) than the transom. Thus, the lift generated at the hull immediately forward of the interceptor has a lower pitching moment than if the lift is generated at the transom, as occurred with conventional interceptors. This creates the further benefit of allowing greater lift to be generated without adversely effecting vessel trim.

Figure 4:
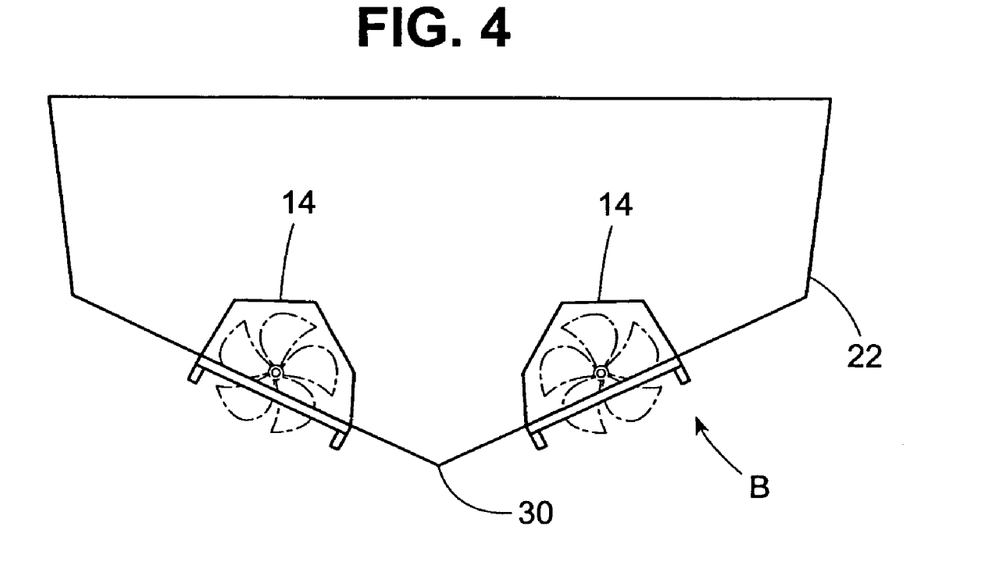
FIG. 4 is a rear view similar to FIG. 2 of a hull having a pair of ventilating propulsion tunnels.
Figure 5:
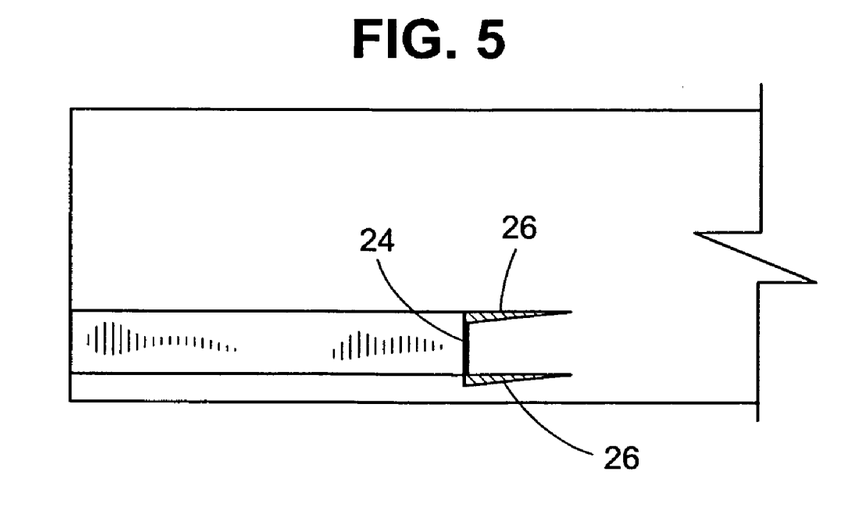
FIG. 5 is a view taken in the direction of arrow B of FIG. 4.

Another embodiment of the invention is illustrated in FIG. 4 in which two ventilating propulsion tunnels 14 are provided, on either side of the keel 30 of the hull. As seen in FIGS. 4 and 5, each of the tunnels is provided with the interceptor plate 24 and side plates 26. As discussed above, the plates 24, 26 may be fixed on the hull, independently adjustable, or the interceptor plate may be adjustable and the side plates fixed. In the embodiment shown in FIGS. 4 and 5 plate 24 is straight to conform with the hull, whereas in the embodiment shown in FIG. 2 the plate is generally V-shaped to conform to the shape of the hull at the keel.

Figure 6:
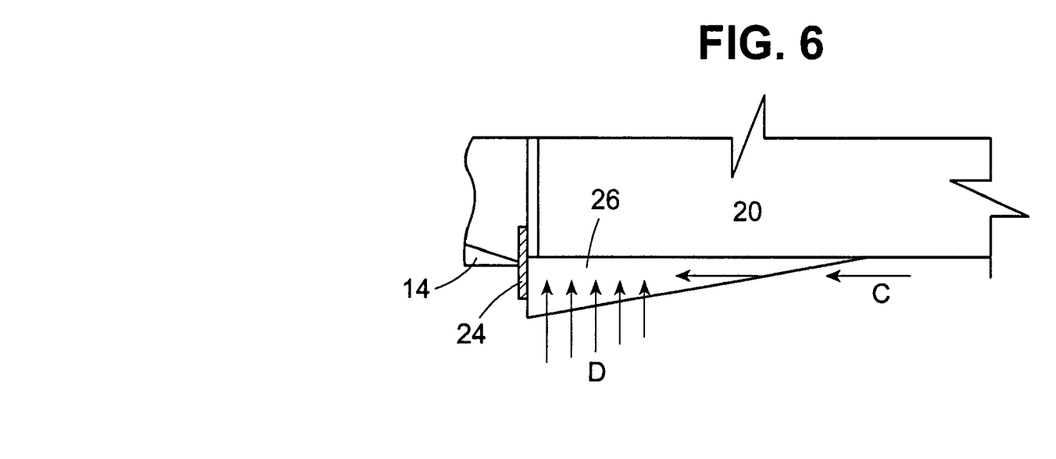
FIG. 6 is a schematic sectional view of a portion of the hull of FIG. 2, taken along line 6-6 of FIG. 2, at and forward of the forward end of a ventilating tunnel.

FIG. 6 is an enlarged sectional view of the interceptor plate and side plate 26 arrangement. The arrows C show the direction of flow of water during forward motion of the vessel along the bottom 20 of the vessel. This flow is intercepted at the leading edge of the tunnel 14 by the interceptor plate 24 and is contained within the side plates 26. This produces the upward lifting force indicated by the arrows D.

Figure 7:
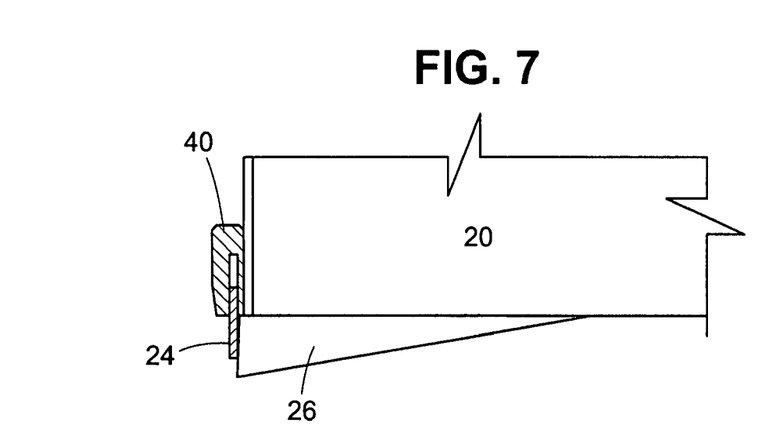
FIG. 7 is a view similar to FIG. 6 showing an electro magnetic device for controlling actuation of the LEPTI.

FIG. 7 illustrates an electric linear actuator 40 for the interceptor plate 24 as an alternative to the fixed plate. The electromechanical actuator can be of any known construction to allow the plate 24 to retract into the hull or extend from the hull at any desired amount within the range of its motion. For example, the plate could be connected to solenoids or magnets which control its position. As mentioned above, the plate can be formed separate from the side plates 26, or can be molded integrally therewith. In that case, the side plates would be received in slots in the hull (not shown) and retracted and extended with the interceptor plate 24.

Figure 8:
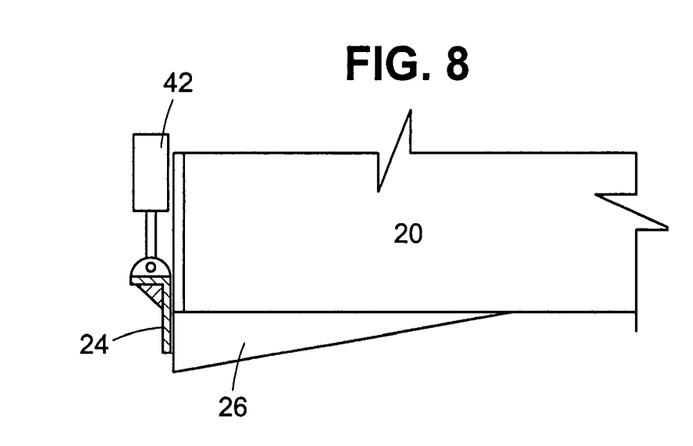
FIG. 8 is a view similar to FIG. 6 showing a hydraulic mechanism for controlling actuation of the LEPTI.

FIG. 8 discloses another embodiment of the invention wherein a hydraulic ram, also of conventional construction, is connected to the interceptor plate 24 to raise it into the hull 20 or extend it beyond the hull. Here again, the plate 24 may be integrally formed with the side plates 26 so that they can be extended and retracted from the hull as well.

In another embodiment of the invention, each of the interceptor plates 24 may be segmented and connected to separate controls so that the amount of liquid intercepted and the pattern of flow and the trim adjustment caused by the interceptors may be varied.

It is noted that in the illustrative embodiment of the invention the interceptors 24 are shown as extending only along the width of the ventilating tunnel. However, it is contemplated that these plates may be wider than the ventilatiing tunnels themselves and extend, for example, from a position near the keel 30 to the chine 22 on the sides of the vessel, across the front of the tunnel.

Applicant has conducted computer based studies with respect to boat hulls having ventilated propulsion tunnels and interceptor plates according to the present invention in order to confirm their effectiveness. The displacement/length ratio of one boat hull studied in connection with this invention was projected to be approximately 250. That ratio is higher than the corresponding ratio for standard planing hulls (which is approximately 220), and indicates that the particular hull studied is "overloaded" and could utilize aid from an auxiliary lifting device. To investigate its effectiveness, an interceptor plate was located across the entire leading edge of the power vent tunnels on the hull which was modeled. As noted before, the leading edge of the prop tunnels is closer to the LCG of the vessel so that placing interceptors at that location decreases the pitch moment from the vessel. In addition, the width of the prop tunnels provide a more effective area for the interceptors than the small space generally available between the tunnels at the transom where such interceptors have been placed in the past.

Because placing the interceptors at the leading edge of the tunnel could have an adverse effect on the flow of water in the tunnel, for example by vortex generation, the side plates 26 were included in the model to mitigate vortex generation and maximize interceptor efficiency. As noted above, the interceptor and side plates may be fixed to the hulls or molded together for simultaneous operation. They also could be independently mounted for independent operation and retraction into and out of the hull, using either the electro-mechanical or hydraulic structures previously described.

The computer studies of this hull form were conducted using a known CFX software with the hull at a trim of 5° over a speed range of 20-35 knots. That matched the bare hull's 16 lt (long tons) draft for all speeds.

Figure 9:
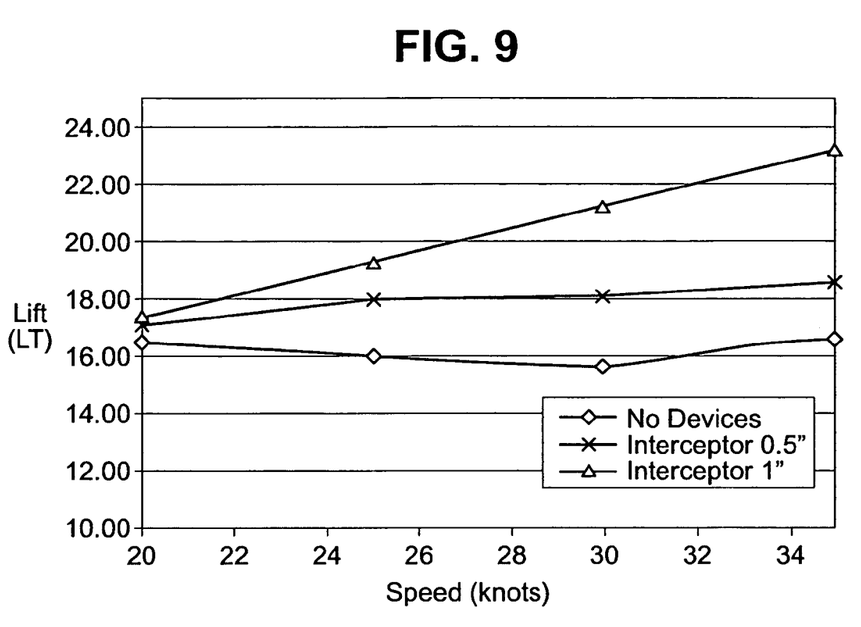
FIG. 9 is a chart demonstrating the effects of the LEPTI at speed and extended ½" or 1" as compared to the same hull with no LEPTI.

FIG. 9 shows the effect of the interceptor plates and the lift applied to the vessel at varying speeds. As can be seen, substantially greater lift is created on the vessel by the presence of a ½" extending interceptor plate, as compared to the same vessel with no interceptor plate. Even greater lifts, particularly at higher speeds, are achieved with interceptor plates that extend 1".

Based on this, it is seen that both the ½" and 1" interceptors provide an increase in total lift at every studied speed, except that the lift at 20 knots was minimal. This would suggest that the interceptors be deployed to extend from the vessel at speeds above 20 knots. At the highest speed studied, the 1" interceptor deflector plate provided eight long tons more lift than the bare hull at the same speed, thereby demonstrating the effectiveness of the system.

Figure 10:
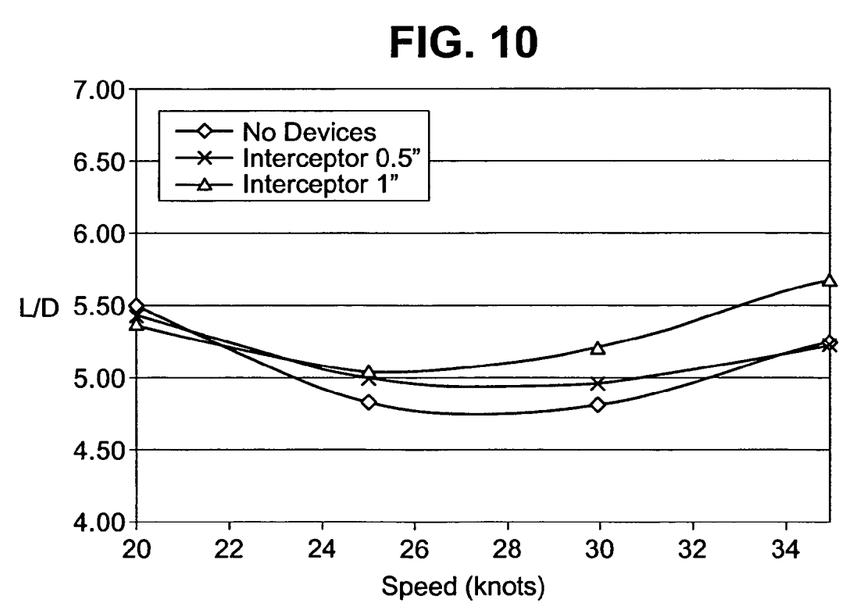
FIG. 10 is a chart showing a similar comparison of lift to drag ratio versus speed for the same configurations.

FIG. 10 is a graph of the lift to drag ratio calculated for the vessel under the same operating conditions, over the same speed range. As seen therein, there is a small increase in hull efficiency lift to drag ratio (l/d) in the entire range of operation, except again at about 20 knots. This again confirms that the deployment of the interceptor plate at speeds above 20 knots increases efficiency of operation of the vessel.

Figure 11:
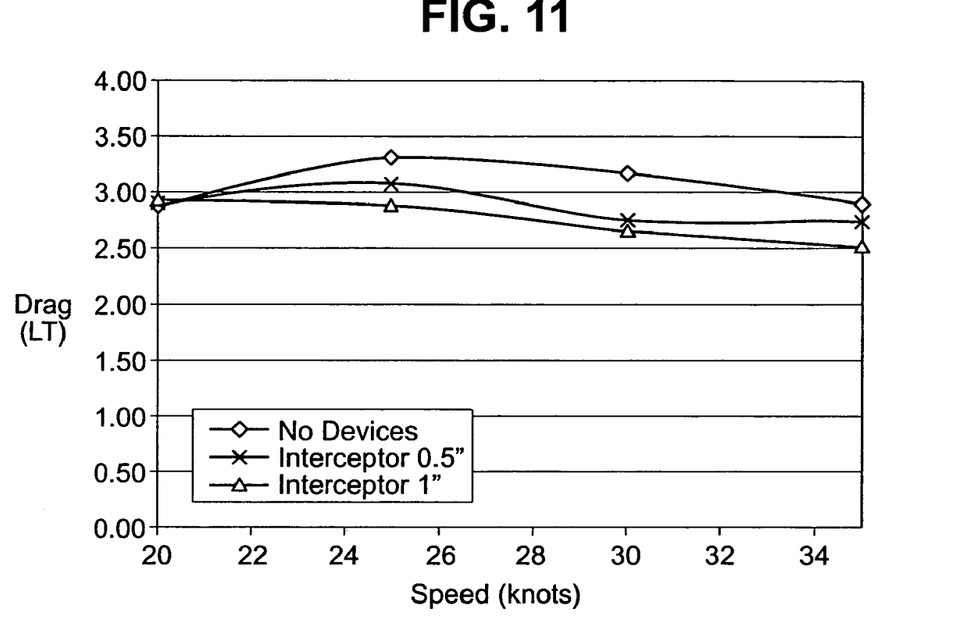
FIG. 11 is a similar chart showing a comparison of drag to speed for the same configurations.

FIG. 11 charts the data recorded with respect to drag versus speed, and it is seen that the total drag created by the vessel at speed is less with the interceptor plates extended than without.

Figure 12:
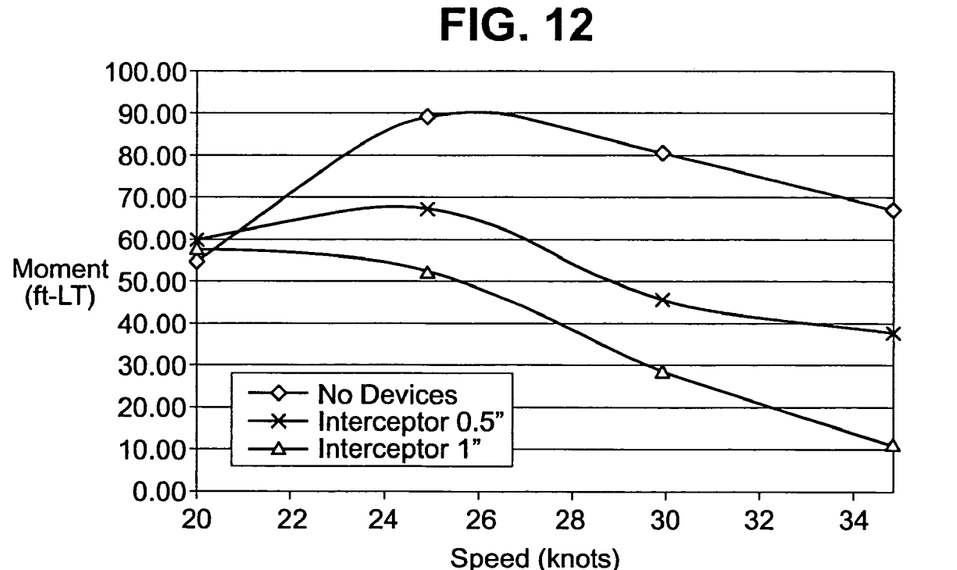
FIG. 12 is another similar chart showing a comparison of trimming moment to speed for the same three configurations.

FIG. 12 summarizes the trimming moment on the vessel versus speed in the same three conditions. Here again, it is seen that above 20 knots the trimming moment with the interceptor extended ½" or 1" is substantially less than the trimming moment applied to the vessel when no devices are present. This delays the hull assuming a bow down position.

Figure 16:
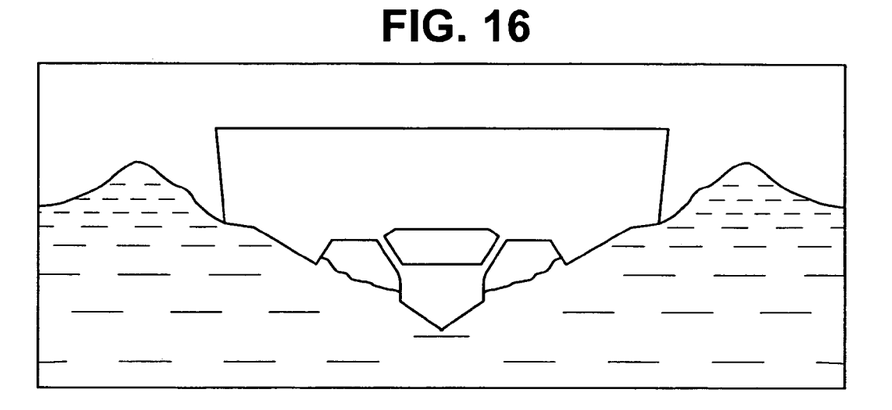
FIGS. 16, 17 and 18 are schematic rear views of the hulls in operation in FIGS. 13, 14 and 15 respectively, showing the water line relative to the hull and tunnels at the rear of the hull at the operational conditions depicted in FIGS. 13, 14 and 15.
Figure 17:
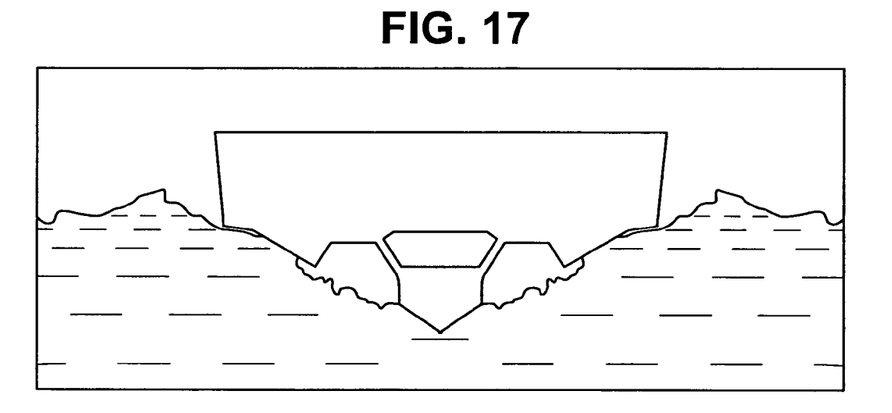
Figure 18:
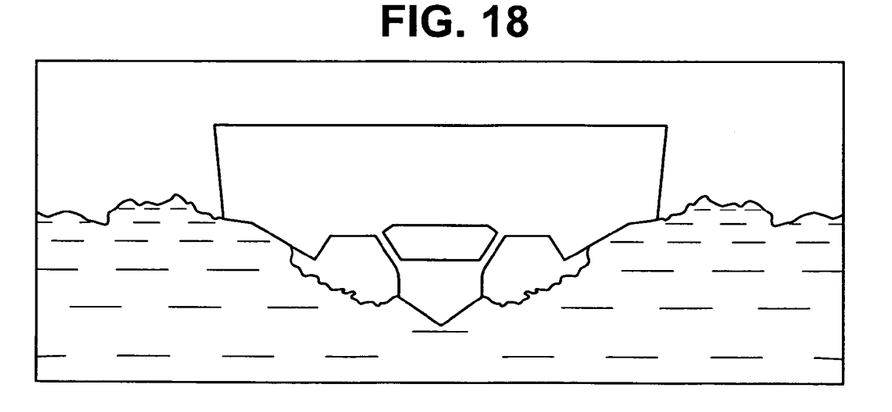

The computer studies have also demonstrated that there is a significant change in the water surface profile within the prop tunnel with the interceptor plates extended. As seen in FIG. 16, the bare hull is shown from the rear with two interceptor tunnels and the water line calculated with the vessel operating at 30 knots. FIG. 17 is similar to FIG. 16, but shows the relationship of the water to the hull with the vessel traveling at 35 knots. As seen therein, in the bare hull condition of FIG. 16 the water does enter into the outboard edges of the tunnels and along the tunnel edges near the keel. This is the normal cutwater condition seen at transoms of ventilating propulsion tunnel vessels. Instead of that condition, with the deflector plate extended ½" as shown in FIG. 17, the water surface at the tunnel sags from the high pressure of the interceptor, creating more ventilated space within the tunnel. In addition, greater lift is applied to the hull so that there is less hull wetted surface area. With the 1" extension of the deflector plates, as shown in FIG. 18, the effect is even more dramatic, with more of the vessel hull out of the water.

The effect on the water surface conditions at the ventilating propulsion tunnels is significant because it reveals that an adjustable interceptor located at the leading edge of the prop tunnel could be used as a method to control the water surface level at the prop, i.e., to control prop immersion. This would be a tremendous aid in broadening the effective speed range of the propellers. An additional computer analysis of the streamlines and vectors of water flow past the interceptor plate did not expose any significant vortices or cross flows in the tunnel. This indicates that the interceptors do not disrupt the flows to the propellers.

In addition, as the interceptors lift the hull out of the water, the hull becomes more efficient. As seen in FIGS. 16-18, visual analysis of the free surface reveals that the drag reduction is due to less wetted hull area and less of the hull's large shoulder in the flow as the hulls drag decreases. In addition, there is a significant reduction in bow up trimming moment, with the 1" interceptor extension having a larger reduction than the ½" extension. At about 35 knots, the moment remains slightly bow up.

Figure 13:
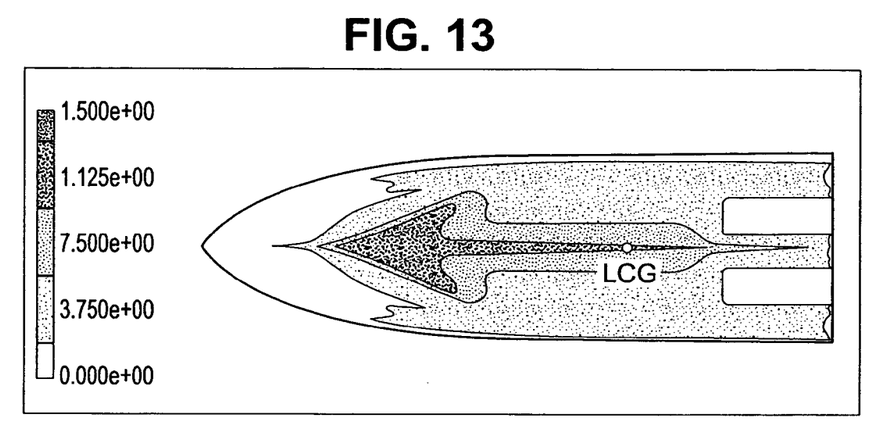
FIG. 13 is a bottom view showing water pressure distribution on a conventional hull having two ventilating propulsion tunnels at 20 knots speed, wherein the different pressure areas are depicted with increasingly denser stippling.
Figure 14:
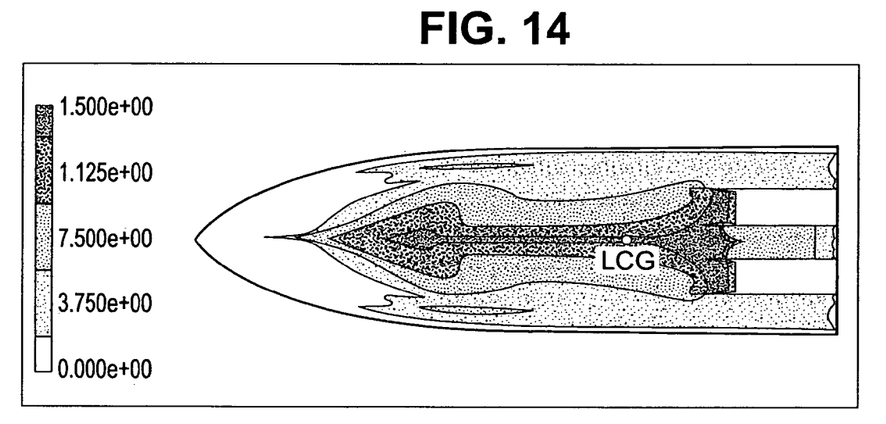
FIG. 14 is a view similar to FIG. 13 of the same hull using LEPTI's according to the invention extended to ½" from the hull.
Figure 15:
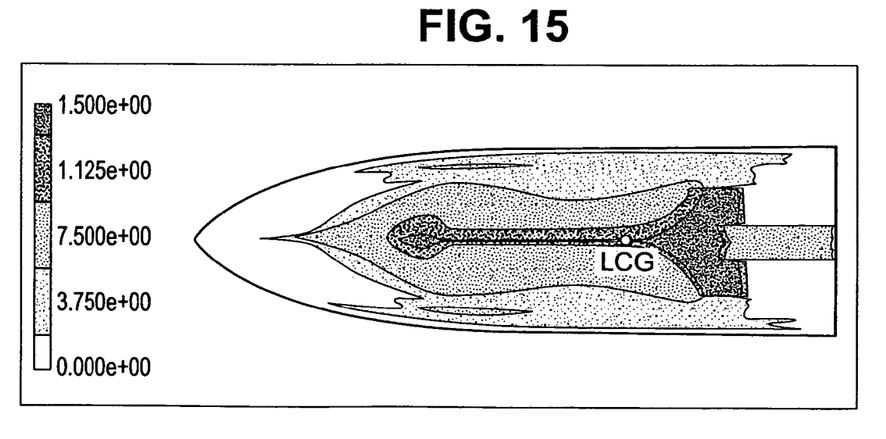
FIG. 15 is a view similar to FIGS. 13 and 14 of the same hull using LEPTI's extended to 1" from the hull.

FIGS. 13, 14 and 15 visually demonstrate these effects by showing the pressure gradients across the bottom of the hull in the three conditions studied. FIG. 13 shows the pressure distribution of the water against the bottom of the hull of the vessel with no interceptor plates present. The clear areas indicate free surface of the vessel, and the stippled areas represent water pressure on the vessels surface with the higher density stippled areas representing gradations of higher pressure.

FIG. 14 demonstrates the operation of the vessel with the interceptors extended ½". As can be seen, less of the boat hull surface is wetted, and there is an absence of higher pressure areas near the transom due to the change in the water surface from the interceptors.

FIG. 15 illustrates the pressure distribution with the interceptor plates extended 1", with low pressure areas at the rear of the vessel and a buildup of high pressure near the LCG. In addition, less overall surface of the vessel is wetted, even at the bow. These figures demonstrate that by extension of the interceptor plate the pressure distribution is translated towards the stem near the LCG as the hull is out of the water. In addition, visual analysis of the hull pressure shows that the high pressure generated by the interceptors leads to the area between the interceptors and increases the hull lift force even more.

Figure 19:
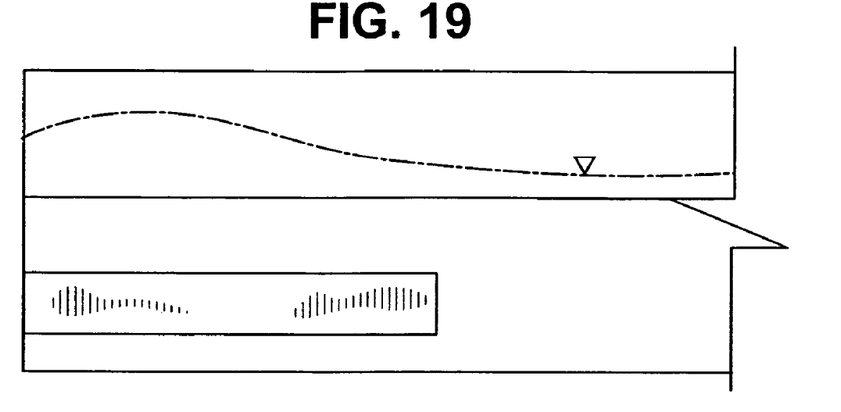
FIGS. 19, 20 and 21 are side views of the aft portions of the hulls in the operating conditions shown in FIGS. 13, 14 and 15 respectively, showing the waterline in each of those conditions relative to the hull and hull chines.
Figure 20:
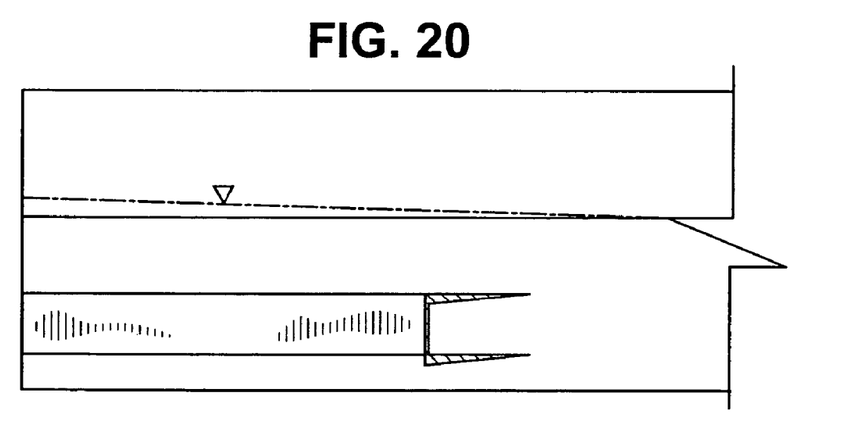
Figure 21:
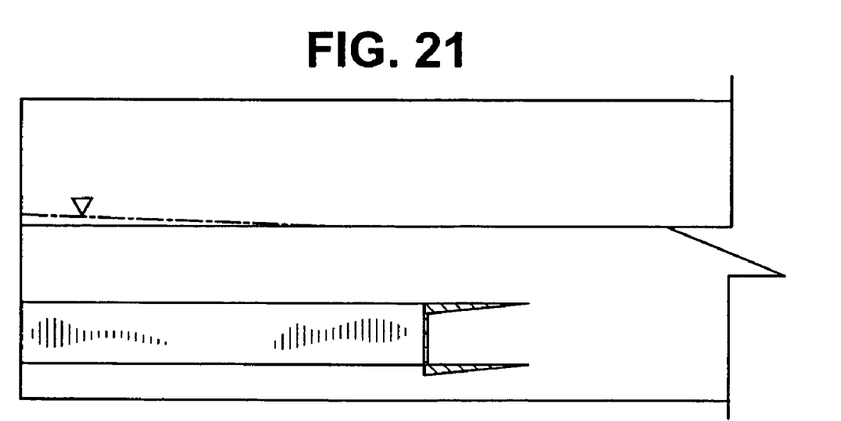

FIGS. 19, 20 and 21 show side views of the hull relative to the waterline position in the same three conditions, again illustrating that with extension of the interceptor, at the appropriate speeds, less of the vessel is in contact with the water.

Although illustrative embodiments of the present invention have been described herein with reference to the accompanying drawings, it is to be understood that the invention is not limited to these precise embodiments and that various changes and modifications may be effected therein without departing from the scope or spirit of this invention.

What is claimed is:

1. A boat or ship hull having at least one ventilating propulsion tunnel formed therein open to the water; said tunnel having a leading edge forward of the hull's transom defining a cutwater whereby the water surface beneath the tunnel lies at the level of the tunnel leading edge and remains generally flat beneath the tunnel, said tunnel being adapted to contain a propeller of the propulsion system, and said hull including interceptor plate means for linear reciprocal movement relative to the adjacent surface of the hull whereby the interceptor plate means may be selectively extended from and retracted relative to the hull.

2. A hull as defined in claim 1, including side plates projecting from said hull located at the propulsion tunnel leading edge corners and running forward therefrom.

3. A boat or ship hull having at least one ventilating propulsion tunnel formed therein open to the water; said tunnel having a leading edge forward of the hull's transom and being adapted to contain a propeller of the propulsion system, said hull including an interceptor plate projecting therefrom at said leading edge downwardly from the hull; and side plates projecting from said hull located at the propulsion tunnel leading edge corners and running forward therefrom; said side plates projecting from said hull approximately 2 to 4 inches at the propulsion tunnel leading edge and tapering forwardly to a height of approximately zero.

4. A hull as defined in claim 1 wherein said interceptor plate means comprises an interceptor plate movably mounted in said hull and the hull includes means therein for varying the projection of the interceptor plate from the hull.

5. A watercraft vessel comprising a hull having at least one ventilated propulsion tunnel formed therein opening downwardly to the water surface when the hull is on the water, said tunnel having a leading edge located rearwardly of the LCG of the vessel defining a cutwater whereby the water surface beneath the tunnel lies at the level of the tunnel leading edge and remains generally flat beneath the tunnel; a surface operating propeller partially enclosed in the tunnel for partial immersion in the water, and an interceptor plate mounted on said hull at the leading edge of the tunnel for linear reciprocal movement relative to the adjacent surface of the hull to project a predetermined distance downwardly from the hull.

6. A watercraft as defined in claim 5 wherein said interceptor plate is movably mounted in the hull for movement between a first retracted position and a second fully extended position.

7. A watercraft vessel comprising a hull having at least one ventilated propulsion tunnel formed therein opening downwardly to the water surface when the hull is on the water, said tunnel having a leading edge located rearwardly of the LCG of the vessel; a surface operating propeller partially enclosed in the tunnel for partial immersion in the water, and an interceptor plate mounted on said tunnel at the leading edge of the tunnel to project a predetermined distance downwardly from the hull; said hull containing two ventilated propulsion tunnels and two movably mounted interceptor plates respectively located adjacent the leading edges of said tunnels.

8. A watercraft as defined in claim 7 wherein said interceptor plates extend from adjacent the keel of the hull to positions adjacent the hull's chine.

9. A watercraft as defined in claim 7 including means for moving said interceptor plates between said first and second positions and into any position therebetween.

10. A watercraft as defined in claim 5 including a pair of side plates extending from said hull from positions adjacent the leading edge corners of the tunnel forward a predetermined distance.

11. A watercraft vessel comprising a hull having at least one ventilated propulsion tunnel formed therein opening downwardly to the water surface when the hull is on the water, said tunnel having a leading edge located rearwardly of the LCG of the vessel; a surface operating propeller partially enclosed in the tunnel for partial immersion in the water, and an interceptor plate mounted on said tunnel at the leading edge of the tunnel to project a predetermined distance downwardly from the hull; and a pair of side plates extending from said hull from positions adjacent the leading edge corners of the tunnel forward a predetermined distance, said side plates being triangular with one leg adjacent the interceptor plate and tapering from that leg forwardly to a point.

12. A watercraft as defined in claim 11 wherein the legs of said plates adjacent the interceptor plate extend further from the hull that the maximum extension of the interceptor plates.

13. A watercraft as defined in claim 6 including a pair of side plates extending from said hull from positions adjacent the leading edge corners of the tunnel forward a predetermined distance.

14. A watercraft as defined in claim 12 wherein said side plates are triangular with one leg adjacent the interceptor plate and tapering from that leg forwardly to a point.

15. A watercraft as defined in claim 14 wherein the legs of said plates adjacent the interceptor plate extend further from the hull that the maximum extension of the interceptor plates.

16. A watercraft as defined in claim 2 or 10 wherein said side plates are integrally formed with said interceptor plate.

17. A watercraft as defined in claim 2 or 10 wherein said side plates are removably mounted in said hull for movement between a first retracted position and a second fully extended position independently of said interceptor plates.

18. A watercraft as defined in claim 17 including means for independently moving said interceptor plate and said side plates.

19. A watercraft as defined in claim 18 wherein said interceptor plate comprises a plurality of independently movable plates mounted in said hull for movement between retracted and extended positions.

20. A watercraft as defined in claim 1 wherein said interceptor plate means extends from adjacent the keel of the ship to positions adjacent the ships chine.

21. A watercraft as defined in claim 1 including means for moving said interceptor plate means between said first and second positions and into any position therebetween.

* * * * *